Jan. 11, 1949.  R. F. HARDY  2,459,026
CAMPING TRAILER
Filed April 10, 1944  2 Sheets-Sheet 1

Inventor
Russell F. Hardy
By Marechal & Biebel
Attorneys

Jan. 11, 1949.   R. F. HARDY   2,459,026
CAMPING TRAILER

Filed April 10, 1944   2 Sheets-Sheet 2

Inventor
Russell F. Hardy
By Maréchal & Biehl
Attorney

Patented Jan. 11, 1949

2,459,026

UNITED STATES PATENT OFFICE 2,459,026

CAMPING TRAILER

Russell F. Hardy, Dayton, Ohio

Application April 10, 1944, Serial No. 530,343

12 Claims. (Cl. 296—23)

This invention relates to trailers, and more especially to trailers which are adapted to be transported by connecting them to an automobile or the like, and also a trailer which can carry various articles such as fishing or hunting paraphernalia and a tent, and which itself is adapted to form a part of a tent for camping.

One of the principal objects of the invention is to provide such a trailer which is simple and compact in construction, which has large storage capacity, and which has parts which serve as covering or body parts of the trailer during transportation and which are adapted to be used as parts of a camping tent or living quarters.

Another object of the invention is to provide such a trailer which can be economically manufactured and maintained, and which has a top and rear portion arranged to serve to enclose the space within the trailer while it is being transported on its own wheels and which is of such construction that the trailer can be disassembled and all of the parts enclosed within the body thereof so that it can serve as its own shipping container.

Another object of the invention is to provide a vehicle of this character which can enclose within its interior, with the top and end in closed position, the various parts necessary for a camping tent to provide housing quarters of substantial extent and which also is of such construction that the vehicle body can be so connected to the camping tent as to provide additional room and sleeping space.

Other objects and advantages of the invention will be apparent from the description and claims and from the drawing.

In the drawing which illustrates a preferred embodiment of the invention and in which like characters of reference designate like parts throughout the several views thereof:

Figure 9:
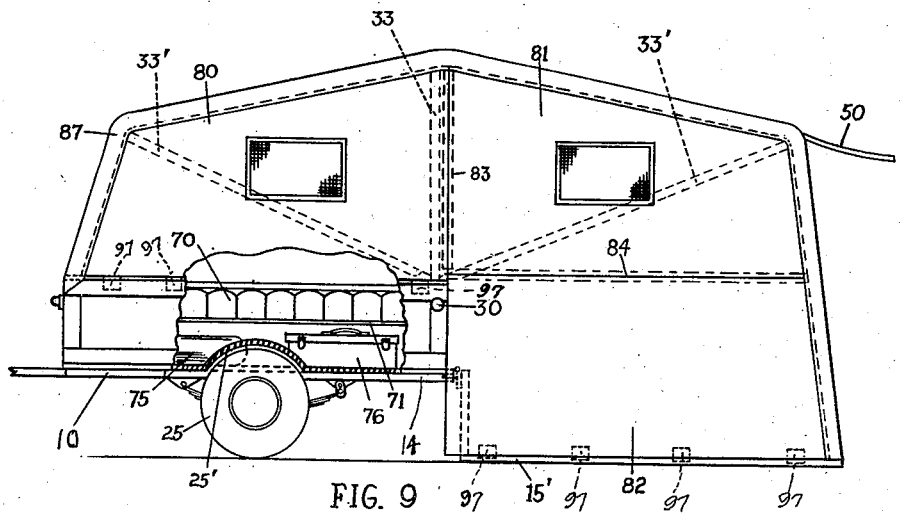
Figure 8:
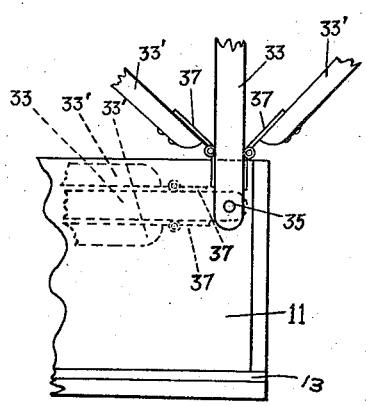

Fig. 8 is a fragmentary side elevation of the rear end of the trailer with parts omitted to show the upright or erected position of the bows for supporting the tent, with the lowered position for road use shown in dotted lines; and Fig. 9 is a side view of the trailer with the tent or housing covering connected thereto and in erected position, the tent in this case comprising sets of stiff side panels for each side which may be connected as shown, as by hinges, or folded and stored inside the body of the trailer when not in use, with portions of the trailer body being likewise broken away to illustrate certain features of construction and utility.

As is well known, many forms of small trailers adapted to be attached by suitable connecting means to the rear end of an automobile so that they may be used to transport fishing tackle, camping equipment, and the like for outing trips have been heretofore used. The present invention, however, provides such a trailer or vehicle which has many advantageous features of construction and utility which were not present in any of the trailers heretofore used, so far as known to me, including the provision of a top cover and rear end gate for the trailer body which are joined and hinged so that they may be moved readily to give open access to the contents in the trailer and also moved into position so that the top rests upon the ground and forms a floor for the rear part or compartment of the tent or housing quarters; a trailer body so constructed as to have the standard tread for the wheels but nevertheless the size of the body considerably widened so that not only will it provide additional storage space but also provide such dimensions as may be utilized to receive and hold a regular size double mattress to give extra sleeping quarters in addition to those provided in the sleeping compartment of the tent; a trailer body having provisions whereby the bows for the tent may be hinged to it so that the tent may thus be fastened upon the portions of the trailer body and properly supported. The construction is also such that the trailer body can receive plywood side pieces, properly held in position, and with a tent cover, the plywood portions being hinged so that they may be carried within the body of the trailer and may also be opened out to form the respective sides of the tent or housing quarters.

Because of the width of the body of the trailer, it will carry an extra large amount of equipment and in addition has provisions for supporting a single or double width regular mattress so that sleeping quarters can be provided within the erected tent or housing inside the trailer body and additional sleeping quarters in the portion of the tent which, when erected, is attached to the top portion (which forms the floor when opened out) to give sufficient additional space to receive a couple of folding cots to thus give additional sleeping quarters. The construction of the tent, and the arrangement of trailer parts described, permit of so locating the door entrance to the tent and of providing a canopy which has the dual function that when supported as an awning it will give an outside covered room or front porch so to speak and will shade the tent door or protect it against ordinary rains, and which canopy with the door closed can be lowered and positioned across it so as to provide added and complete protection against rain and wind from all directions. Also the construction is such that the wheels, springs, etc. may be readily removed and placed inside the body of the trailer so that with the movable top and end locked in position the trailer body may be used as its own shipping container for all its necessary operating parts, and also for such other parts as are desired to be positioned therein.

Figure 6:
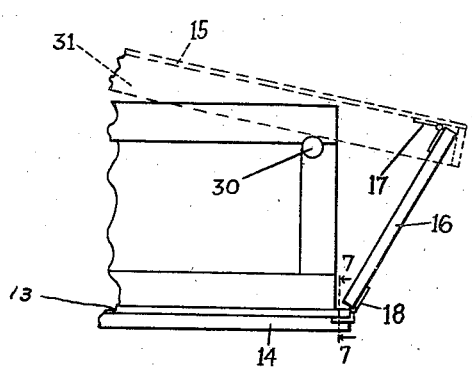
Fig. 6 is a fragmentary side elevation with the rear end of the trailer showing certain features of construction in greater detail.
Figure 7:
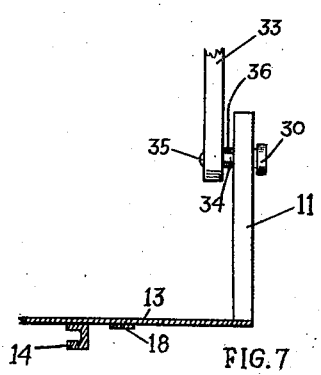
Fig. 7 is a fragmentary sectional view on the line 7—7 of Fig. 6.

As illustrated in the embodiment of the invention shown in the drawings the trailer comprises a body portion consisting of a steel frame member 10 to which is fastened a body member having two side portions 11, only one of which is shown in detail but which are duplicates of each other, and a front member 12 which is interposed at the front of the trailer body between the sides 11. The body is provided with a bottom 13 of wood or other suitable material affixed to the steel frame which may be satisfactorily fabricated of channel side pieces with suitable bracing, a channel side piece being shown in Figs. 6 and 7 and designated 14. This frame is held to the body in suitable manner as by means of bolts not shown. The two side members 11 and front member 12 being suitably affixed to the bottom, together form the main body of the trailer. Since the trailer is so constructed that parts external to the body may be removed and placed therein for shipping, so that the trailer body may be used as its own shipping container, the parts 11 and 12 are illustrated diagrammatically as permanently affixed but they may be affixed by any means which will connect them with suitable rigidity and strength for the purposes for which the trailer is to be used, e. g. by means of hinges and latch members, holding brackets etc. The trailer also is provided with a top portion 15, which is pivotally connected at its rear end to the top of the rear end or rear gate portion 16 of the trailer body, as by means of a hinge construction indicated diagrammatically by the numeral 17 in Figs. 2 and 6. This rear end or gate 16 is likewise hinged along its lower edge to the bottom 13, this hinge being of suitable construction to permit ready lowering of the rear gate 16 and illustrated, likewise diagrammatically, by the part 18.

As shown, the top portion 15 has means 20 at the front end for locking the top in closed position, resting upon the upper face of the side members 11 and the front member 12 and also being suitably supported by the top edge of the rear gate at the hinged connection 17. When locked in this position the rear gate 16 is likewise pulled up snug and tight against the rear ends of the sides 11 so that the entire trailer body is tightly enclosed and all of the parts are suitably held, so that the trailer body may be used as its own shipping container as referred to, or it may be suitably closed when mounted upon the wheels 25, to be connected to the rear of an automobile or other suitable vehicle by means of the locking member 26, which may be of suitable construction to connect on to a cooperating locking member carried by the automobile, or so formed as to hook on to any fixed portion provided at the rear of the automobile. The part 26 is shown diagrammatically as a conventional form of lock attaching member such as means by which trailers generally are connected with a cooperating member which may be fastened to the rear of an automobile or other suitable vehicle with the two members having proper play and adjustability to permit of hauling the trailer behind the automobile with "tracking" adequate for practical uses and also to permit of meeting the conditions necessary for road curves, irregularities in the road, etc.

Figure 2:
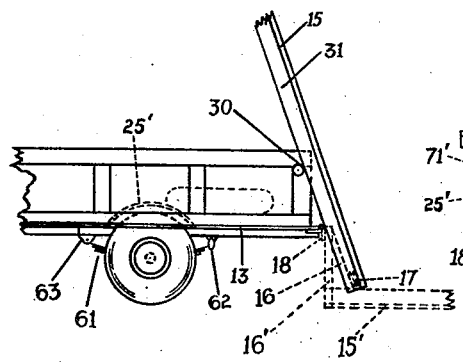
Fig. 2 is a side view of the trailer showing the top and end moved partly away from the closed position toward the position they will occupy when the trailer is being used in connection with a tent.

In Fig. 2 the top 15 and end gate 16 are shown in full lines at a midway point in the elevation and folding back of the top and end gate, continued movement of the top 15 to the right serving to swing the rear or end gate down and into reversed upright (i. e. substantially vertical depending) position and the top down so that the top face of the top rests on the ground, as indicated by the numerals 15' and 16' respectively. When thus positioned the top resting upon the ground forms a flat floor of substantial size, preferably approximately 7 feet long and 6 feet wide, which, as shown in Figs. 3 and 9 for example, provides the floor for a tent which in its cross sectional area is approximately the size of the trailer body itself.

Figure 3:
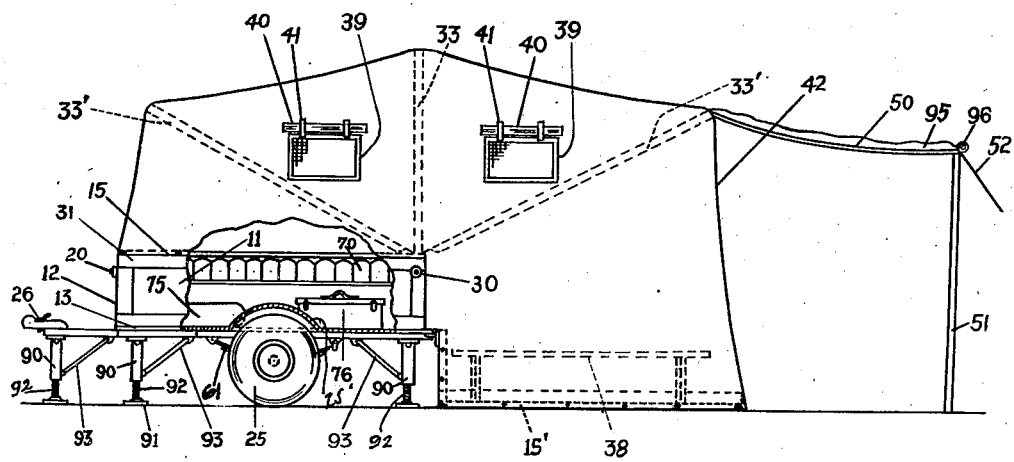
Fig. 3 is a side view, in elevation, with parts of the trailer body broken away to illustrate the positioning of the mattress, tire, trunk, etc.; and showing the general outline of the trailer with the tent connected thereto and elevated for use.

The outside of each of the members 11 carries a roller 30, which is rotatably mounted in such position at the top that the lower edge of each of the over-turned sides of the top 15, which are shown as side rails marked 31, will ride upon one of the rollers so that the top may be more readily and more easily moved rearwardly and swung through the position indicated in dotted lines in Fig. 2 to the position shown in Figs. 3 and 9, this roller serving somewhat as a shifting fulcrum about which the top 15 swings so that as the top is pushed toward the rear and tends to tilt up, its movement is facilitated by the rollers and its resisting weight tends to decrease as the rear portion of the top and the rear end gate move downward and as a result very much less effort is required to lift the top and swing it over and down into its required position along the ground. Also corresponding depending rails 32—32' are provided across the rear and front ends respectively of the top, which thus fits snug around the front and sides of the body and its end gate, when the top and end gate are in body enclosing position and which extends upwardly to prevent ingress of water onto the floor when the tent is erected, these rails being preferably several inches in width and thus capable of fending off a correspondingly deep layer of water upon the ground.

Also, in the form of construction shown in Fig. 3 a bow 33 made of metal rods or formed wood, or the like, is pivotally connected at its opposite ends to the rear upper corners of the side members 11. As shown more particularly in Figs. 7 and 8, the bow 33 has each of its ends connected to a bolt 34 which passes through its respective side member 11 and is suitably fastened therein, and carries upon its outer end the roller 30, the inner side of the pin having a retaining head 35, and a spacing sleeve 36 being also positioned about the bolt between the pivoted end of the bow 33 and the side portion 11, to thus hold the bow member 33 at each of its ends a sufficient distance from the inside of each side member 11 so that when the supporting bow members are folded down there will be sufficient space for folding the tent covering down into the body of the trailer. Pivotally connected to each end of each bow member, and upon opposite sides thereof, are two extra bow members 33' each of which is shown as pivotally connected to the bow member 33 by means of a hinge 37. This construction as shown clearly in Figs. 7 and 8 permits of raising the bow 33 to substantially vertical position around the supporting pin 34, at the same time moving the cooperating bows 33' to substantially the position shown in Figs. 3 and 8 so that they will support the front and rear of the top of the tent covering. The lower end of the tent covering can be fastened in any suitable way, as by means of snap fasteners, to the top portions of each side member 11 and the front end 12 and also to the outside faces of the side rails 31, thus fastening the tent securely to the trailer body portion and also to the bottom portion which rests on the ground the same as the floor. With the form of construction as illustrated for example in Fig. 3, when it is desired to arrange the trailer and its associated parts to form a tent or housing compartment, the top 15 and the end gate 16 are moved back and down as above described and into the position shown in Fig. 3 whereupon the tent, and the bows 33—33' may be pulled into erected position as shown, the center bow 33 supporting the top of the tent and the two bows 33' supporting respectively the front top edge and the rear top edge, as shown in Fig. 3.

The top 15, in such arrangement of the parts, rests upon the ground and forms a floor which thus provides additional room for sleeping or living quarters. Because of this construction the floor serves to exclude the dampness of the ground and to minimize the entrance of insects, etc. The size of the trailer is such that the portion of the tent which is connected to the part 15' is large enough to take two full size cots, indicated by the numerals 38, and this construction also permits of providing a tent of sufficient height to permit of people walking erect and moving about comfortably, the cots 38 preferably being of the folding type so that they may be moved out of the way when not in use and this area in the daytime may serve as living quarters with ample space being available for a table and 4 camp stools. Windows 39 may be provided in each side of the tent. Each window may be covered merely with mosquito netting if desired, or with other suitable covering material such as some of the transparent plastics, or some of the thin plastic materials which are sufficiently flexible so that they may be utilized and packed without damage. Preferably the tent is provided with a flap portion 40, which flap portion is of the same material as the main portion of the tent and is so arranged that it may be rolled up and held by means of straps 41 having suitable snap fasteners, so that the windows may be open, and which may be fastened to cover over the windows when desired to keep out rain, and to make the tent generally tighter and more snug during chilly weather, etc.

The rear portion of the tent also has a rear portion or wall 42 which in effect forms a rear wall for the living quarters room and this portion also extends down and is suitably connected at its bottom to the top portion as it lies upon the ground.

This rear wall 42 is provided with a door opening 43 which has a door covering consisting of a flap, as of tent fabric, 44, this door covering as shown being of greater dimensions than the door opening, and having connectors, such as snap connectors which permit of closing the door flap by fastening to the cooperating members carried by rear wall 42. As indicated by shading the door opening also may be provided with a covering such as mosquito netting 45.

Suitably attached to the tent as to the top of the back wall 42, either permanently by sewing or by means of suitable snap fasteners, is a canopy or awning portion 50, which may be supported by suitable supporting rods 51 to provide a cover which in effect gives a veranda or sun porch effect, that is, an outside covered portion which can be utilized for dining table, or for chairs, or the like, and which will be protected against sunshine, rain, etc.

Figure 4:
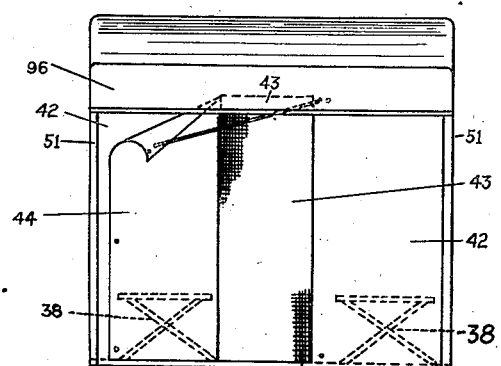
Fig. 4 is an end view of Fig. 3, looking from the right of the drawing, showing the overhanging canopy and other arrangements for storm protection of the door.

This canopy 50 is also arranged so that by removing the supporting rods 51 and the bracing cords or ropes 52, the canopy may be dropped down over the door opening and the covering therefor and fastened by snap fasteners or the like to the back wall of the tent, to thus give an extra protective thickness against beating rains, wind, and the like. The door covering 44 is preferably provided with a rope a portion of which is illustrated in Fig. 4 by the numeral 55, which rope is long enough to extend into the inside of the tent, so that by pulling upon the rope the door covering may be drawn to closed position from inside the tent.

Figure 1:
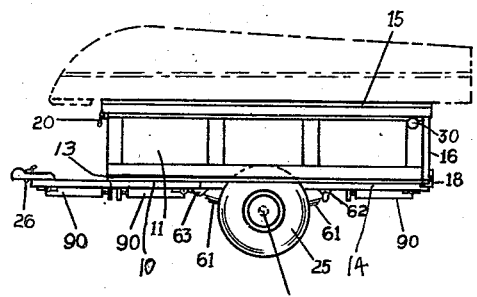
Fig. 1 is a view of a trailer with a flat top and end in position for enclosing the tent, sleeping equipment etc., ready for transport along the road; and with extra equipment or implements, such as a boat or canoe shown in dotted lines as positioned upon the flat top, an advantageous feature.
Figure 5:
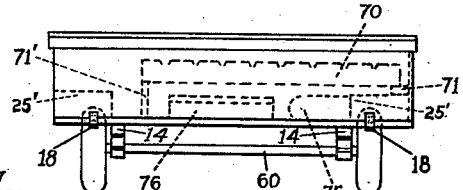
Fig. 5 is a rear end view of the trailer body with the back gate and top in closed position for road use, with certain enclosed parts shown in dotted lines.

The wheels 25 are mounted upon an axle 60 which in turn is connected to the springs 61, these springs being connected by means of suitable shackles and bolts or other connecting means 62 and 63 to the frame for the trailer body, the general location of the axle being shown in dotted lines in Fig. 1 by the numeral 60. The connecting parts 62 and 63, and the axle connected to them, are so fastened to each other and to the frame of the trailer that the springs and the axle and the wheels may be removed, if desired, and these parts placed inside the trailer body. As will be noted in Figs. 1, 2, 3 and 5, while the wheels 25 are positioned the right distance apart for standard tread, the body of the trailer is made wider so that housings may be provided inside the side members 11 to receive the wheels. These housings are shown in full lines in Figs. 3 and 9 and in dotted lines in Figs. 2 and 5 and designated 25'. This has the double advantage of giving extra width, and therefore substantially increased floor space within the trailer, and also permits of utilizing larger size wheels without the necessity of protruding mud guards and the like, and at the same time permits of having the axle and wheels so mounted with respect to the bottom of the trailer that the distance of the rear end of the trailer from the ground will equal the height necessary to permit of moving the rear gate and the top to the position shown in Fig. 2, in which the top 15' rests upon the ground. That is, the depth of the body and the corresponding depth of the end gate are substantially the same as the distance from the body bottom to the ground, so that when swung over and back to the tent erecting position the flat top will rest substantially horizontally along the surface of the ground. A body depth of about 20-24 inches has been found very satisfactory, both as to stability and ease of handling on the road and as to adequate room when the tent is erected and adequate storage space during transportation. By means of this construction, also, larger size tires can be used without lifting the trailer body too far above the ground while nevertheless the depth of the trailer body may thus be substantially increased to thus give more storage space and also to provide so that a full size regular double mattress, 70, having suitable supports 71—71' may be carried to provide an extra full size bed, in addition to the cots which may be positioned in the tent portion over the top 15', and cots which might be used under the canopy 50 in good weather. By this arrangement the body of the trailer may be made, satisfactorily, six feet wide and seven feet long; thus permitting the use of a full length mattress which may be also adequately wide—say 54 inches—to thus give a full size bed, with room alongside for convenient movement permitted in the trailer body and for storage. This extra height and width also provide for adequate storage space to one side of the mattress 70, and likewise permit of adequate space under the mattress which may be used for carrying necessary or desired articles, an extra tire 75 being shown as carried beneath the mattress, in Figs. 3, 5 and 9 as well as a piece of luggage 76. Another advantage of this general construction is that if desired the wheels may be made of such size as to take tires 25 which correspond in size to the tires of the automobile to which the trailer is to be attached so that extra tire protection may be provided by carrying an extra tire in the trailer or the usual protection may be accorded by using the spare tire of the automobile in case of a puncture to one of the tires of the trailer, thus releasing additional storage space in the trailer body.

The construction shown in Fig. 9 is generally the same as heretofore described except that in this construction the side wall portions 80, 81 and 82 may be made of some rigid material, such as plywood, with the parts hinged together as shown in dotted line at 83 and 84, the hinging being such that the several sections may be folded one upon the other, and these sections being of such size when thus folded that they may be positioned within the body of the trailer. In this form of construction a canvas or tent material cover 87 is provided which has means for fastening its overturned edges along the edges of the side pieces 80, 81 and 82, to provide a solid wall side for the tent space with a fabric or tent material cover, the construction being otherwise substantially the same as above described.

The bows 33—33' may be used with such plywood sides, and the plywood sections may be provided with suitable pins or projections 97 to fit into corresponding recesses in the sides of the bow portion and in the rail of the top portion when it is upon the ground, as indicated in dotted lines. The bows under such circumstances would support the top tent covering, and would also hold the plywood sides properly spaced apart. If desired, however, suitable cross bracing members can be provided, either hinged to extend across between the two top plywood sections to hold them spaced apart, or shallow grooves may be cut in the top of the plywood sections to receive cross bracing bars of wood or the like, having reduced ends to fit into the grooves, to thus form shoulders effective against the inside of the plywood sections to hold them spaced apart against the pull of the tent top.

As shown, particularly in Figs. 1 and 3, suitable jacks 90, shown diagrammatically, may be pivotally connected to the body or the metal supporting frame for the body. These jacks, as shown, are so arranged that when the trailer is being transported along the road they are held in place against the bottom of the trailer by means of suitable clips or latches. When it is desired to set up the trailer and its associated parts, as shown in Fig. 3 for example, the several jacks may be released and lowered, each jack being so constructed as to have a foot 91 at the end of a threaded stem 92, so that by proper relative movement the several feet 91 may be brought to rest against the ground to thus provide adequate and stable support for the trailer body and to keep the body with its bottom in normal horizontal position and prevent tipping or tilting when in use as housing quarters. Also, as shown, each of the jacks is preferably provided with a pivoted arm 93, pivotally connected to the jack and also to the body, so that when the jacks are in the position shown in Fig. 3, these supporting arms or rods 93 may be latched to hold the jacks rigidly in position.

If desired, also, canopy or awning portions 50 may have side or end flaps which are shown as rolled up out of the way in Fig. 3, and designated by the numerals 95 and 96 respectively. These flaps can be held rolled up by means of straps and strap fasteners as heretofore described in connection with the window coverings; and any one or more of them may be lowered so as to serve as a side wall for the space under the canopy 50. The top 15 is preferably made flat to provide a flat floor, as described above and if desired, it may also be provided with fasteners, so that a boat, or other objects may be readily carried upon the flat top when it is fastened down in closed position upon the body of the trailer; and, if desired, the canopy may be made readily detachable and used as a covering for luggage, or other articles, thus carried on the top.

While the apparatus as described represents preferred embodiments of the invention, it is to be understood that changes may be made therein without departure from the proper scope of the invention as disclosed and as defined in the appended claims.

What is claimed is:

1. A vehicle of the character described comprising a body portion, said body portion having a floor, sides and a front end portion attached thereto, a rear end gate mounted to swing about a horizontal axis positioned substantially at its lower edge and at the rear end of the floor of said body portion, a top to cover over said body portion, and means providing a pivotal connection between said top and the upper edge of said end gate, the mounting for said end gate and said top cover being such that the end gate may be swung up to substantially vertical position to close the end of said body portion and the top portion swung to close over said body portion as a top therefor and the end gate may be swung to a substantially vertical depending position and the top cover to substantially horizontal position resting upon the ground, the relative mounting of the top portion and the end gate being so constructed that the top portion may be swung through an arc of substantially 90° while the end gate is in said substantially vertical depending position and providing support for the top portion during said last named swinging movement.

2. A vehicle of the character described comprising a body portion, said body portion having a floor, sides and a front end portion attached thereto, a rear end gate mounted to swing about a horizontal axis positioned substantially at its lower edge and at the rear end of the floor of said body portion, and a top to cover over said body portion and mounted to swing about the upper edge of said end gate, the mounting for said end gate and said top cover being such that the end gate may be swung up to substantially vertical position to close the end of said body portion and the top portion swung to close over said body portion as a top therefor and the end gate may be swung to a substantially vertical depending position and the top cover to substantially horizontal position resting upon the ground, the relative mounting of the top portion and the end gate being so constructed that the top portion may be swung through an arc of substantially 90° while the end gate is in said substantially vertical depending position and providing support for the top portion during said last named swinging movement, the top portion also being provided with depending rail means adapted to overlap the sides of said body portion when the top portion is in closed position and to provide a guard rail when the top portion is resting upon the ground, and roller means mounted on the outside and adjacent the rear of said body portion and cooperating with said rail means to provide support for said top cover during swinging movement of the latter and said end gate.

3. A vehicle of the character described comprising a body portion, said body portion having a floor, sides and a front end portion attached thereto, a rear end gate mounted to swing about a horizontal axis positioned substantially at its lower edge and at the rear end of the floor of said body portion, a top to cover over said body portion, means providing a pivotal connection between said top and the upper edge of said end gate, the mounting for said end gate and said top cover being such that the end gate may be swung up to substantially vertical position to close the end of said body portion and the top portion swung to close over said body portion as a top therefor and the end gate may be swung to a substantially vertical depending position and the top cover to substantially horizontal position resting upon the ground, the relative mounting of the top portion and the end gate being so constructed that the top portion may be swung through an arc of substantially 90° while the end gate is in said substantially vertical depending position and providing support for the top portion during said last named swinging movement, and means for supporting a tent or housing to enclose a housing space within said body portion and above said top portion when said top portion is resting on the ground.

4. A vehicle of the character described comprising a body portion, said body portion having a floor, sides and a front end portion attached thereto, a rear end gate mounted to swing about a horizontal axis positioned substantially at the lower edge and at the rear end of the floor of said body portion, a top to cover over said body portion, means providing a pivotal connection between said top and the upper edge of said end gate, the mounting for said end gate and said top cover being such that the end gate may be swung up to substantially vertical position to close the end of said body portion and the top portion swung to close over said body portion as a top therefor and the end gate may be swung to a substantially vertical depending position and the top cover to substantially horizontal position resting upon the ground, the relative mounting of the top portion and the end gate being so constructed that the top portion may be swung through an arc of substantially 90° while the end gate is in said substantially vertical depending position and providing support for the top portion during said last named swinging movement; and means carried by the body portion for supporting a tent covering comprising tent supporting bows pivotally mounted within the body portion, and means for connecting said tent covering to the body portion and to the top portion when said top portion is resting on the ground, the mounting for said bows including spacer means maintaining said bows in spaced relation with said body portion and providing clearance therebetween for said tent covering when said covering is folded within said body portion.

5. A vehicle of the character described comprising a body portion, said body portion having a floor, sides and a front end portion attached thereto, a rear end gate mounted to swing about a horizontal axis positioned substantially at its lower edge and at the rear end of the floor of said body portion, a top to cover over said body portion, means providing a pivotal connection between said top and the upper edge of said end gate, the mounting for said end gate and said top cover being such that the end gate may be swung up to substantially vertical position to close the end of said body portion and the top portion swung to close over said body portion as a top therefor and the end gate may be swung to a substantially vertical depending position and the top cover to substantially horizontal position resting upon the ground, means carried by the body portion for supporting a tent covering comprising bow members one of said bow members being mounted at its opposite ends upon pivots carried inside the side members and the other bow member pivotally mounted upon said first bow member for collapsing movement substantially into contact with the first bow member the mounting of said first bow member being constructed to permit the bow members to be moved together to be collapsed into the interior of the body portion and of being raised and separated to form supports for a tent covering constructed to be connected around the top of the sides and front end of the body member and around the sides and free end of the top member when positioned on the ground, the pivots for each of said first named body members being spaced from the upper edge of said body portion to an extent substantially equal to the thickness of a further bow member pivoted to the backs of said first named bow members and providing for said bows to be folded into horizontal position below said top cover and maintained in spaced relation above said floor to provide storage space thereunder.

6. A vehicle of the character described comprising a body portion, said body portion having a floor, sides and a front end portion attached thereto, a rear end gate mounted to swing about a horizontal axis positioned substantially at its lower edge and at the rear end of the floor of said body portion, and a top to cover over said body portion and mounted to swing about the upper edge of said end gate, the rear end gate being hinged to the rear end of the body portion along one edge of the gate and the top cover member hinged along the other edge of the gate, the hinge connections between the end gate, the top portion and the body portion being constructed so that the end gate may be swung from upper substantially vertical position to substantially depending vertical position and the top cover may be swung about its hinged connection with the end gate from substantially horizontal body-covering position to position to lie upon the ground and from said last named position through an arc of substantially 90° with respect to said end gate, said body portion including means for supporting said top cover during swinging movement of said rear end gate, said last named means being in addition to said hinged connection between said end gate and said body portion.

7. A vehicle of the character described comprising a body portion, said body portion having a floor, sides and a front end portion attached thereto, a rear end gate mounted to swing from body enclosing position to a substantially vertical depending position, a top body cover, means pivotally connecting said top body cover to the rear end gate for swinging movement and constructed to swing the top cover to substantially horizontal position resting upon the ground when the rear end gate is moved to vertical depending position, the relative mounting of the top portion and the end gate being so constructed that the top portion may be swung through an arc of substantially 90° while the end gate is in said substantially vertical depending position and providing support for the top portion during said last named swinging movement, and means for supporting a mattress within said body portion so that its upper surface would be below the top when in body enclosing position and its lower surface will be supported above the floor of the body portion to provide storage space for a spare tire, tent and supporting equipment therefor and traveling equipment.

8. A vehicle of the character described comprising a body portion, said body portion having a floor, sides and a front end portion attached thereto, a rear end gate mounted to swing about a horizontal axis positioned substantialy at its lower edge and at the rear end of the floor of said body portion, a top to cover over said body portion, means providing a pivotal connection between said top and the upper edge of said end gate, the mounting for said end gate and said top cover being such that the end gate may be swung up to substantially vertical position to close the end of said body portion and the top portion swung to close over said body portion as a top therefor and the end gate may be swung to a substantially vertical depending position and the top cover to substantially horizontal position resting upon the ground, means comprising cooperating sections of plywood or the like detachably connected to the body portion and to the top portion when it is resting upon the ground to provide sides for a housing enclosure for the body and the space above said top, said means including connections providing a knock-down construction for said side portions, a tent covering for attachment to the top of said side members, and means for holding said side members properly spaced to support said tent covering and to provide a housing enclosure for the space above the body and above the top when positioned upon the ground.

9. In a trailer a body portion having a floor, sides, and a front end portion attached thereto, a rear end portion pivotally mounted at about the floor level, a top pivoted to the rear end portion at about the level of the top of the sides and the ends of the body portion, said top comprising a cover with rails to set down over the sides and end portions, bolts mounted in the sides near the upper rear ends thereof, bows for supporting tent covering means pivotally mounted on the bolts inside the body portion, rollers mounted on the bolts outside the body portion so that the said rails make contact therewith in some positions when said end portion is swung about the pivotal mounting thereof to said body portion, the height of the said end portion being about equal to the height of the floor above the ground.

10. A trailer comprising a box having a floor, a top and enclosing sides, the height of the sides being about equal to the height of the floor above the ground, the top being pivoted to one of said sides and said one side being pivoted at the bottom, and rollers mounted adjacent the pivoted side and making supporting contact with the top in some positions thereof as said pivoted side is swung about said bottom pivoted connection thereof.

11. A trailer having a body portion and a member connected thereto, said connection including means intermediate said body portion and said member and pivotally connected to each thereof, said member and connection being so constructed as to be capable of acting alternately as a top for the trailer or as a floor in contact with the ground, and means on the body portion spaced from said connection to support the said member when it is being moved between its alternate positions.

12. A kit comprising a box provided with a top, means to pivot the top of the box to a side thereof, means to pivot said side to a bottom of the box, means to lock the box in a closed position, said top having a rail enclosing the upper portions of the sides of the box; said box containing tent bows pivoted to the box, running gear to transform the box into a trailer, means to attach the trailer to a vehicle, and a double bed, the height of the said pivoted side being about equal to the height of the box bottom above the ground when mounted on its running gear.

RUSSELL F. HARDY.

REFERENCES CITED

The following references are of record in the file of this patent:

UNITED STATES PATENTS

| Number | Name | Date |
|---|---|---|
| 1,185,981 | Campbell et al. | June 6, 1916 |
| 1,427,365 | Douglas | Aug. 29, 1922 |
| 1,471,479 | Gleissner | Oct. 23, 1923 |
| 1,533,820 | Whitehead | Apr. 14, 1925 |
| 1,895,933 | Kuns | Jan. 31, 1933 |
| 2,131,110 | Lynn | Sept. 27, 1938 |
| 2,152,713 | Stewart | Apr. 4, 1939 |

FOREIGN PATENTS

| Number | Country | Date |
|---|---|---|
| 376,278 | Italy | Nov. 8, 1939 |
| 498,162 | Great Britain | Jan. 4, 1939 |
| 680,214 | Germany | Aug. 24, 1939 |
| 807,639 | France | Oct. 19, 1936 |
| 842,086 | France | Feb. 27, 1939 |